US010350997B2

(12) United States Patent
Nishihara (10) Patent No.: US 10,350,997 B2
(45) Date of Patent: Jul. 16, 2019

(54) VEHICLE POWER CONTROL SYSTEM AND VEHICLE POWER CONTROL METHOD

(71) Applicant: SUZUKI MOTOR CORPORATION, Hamamatsu-Shi, Shizuoka-Ken (JP)

(72) Inventor: Takashi Nishihara, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/244,634

(22) Filed: Aug. 23, 2016

(65) Prior Publication Data

US 2017/0057354 A1 Mar. 2, 2017

(30) Foreign Application Priority Data

Aug. 24, 2015 (JP) ................................ 2015-165124

(51) Int. Cl.
| | |
|---|---|
| *B60K 28/16* | (2006.01) |
| *B60W 30/18* | (2012.01) |
| *B60W 50/16* | (2012.01) |
| *B60W 50/14* | (2012.01) |
| *B60W 30/14* | (2006.01) |
| *B60K 31/00* | (2006.01) |

(52) U.S. Cl.
CPC ........... *B60K 28/16* (2013.01); *B60W 30/146* (2013.01); *B60W 30/18172* (2013.01); *B60W 50/14* (2013.01); *B60W 50/16* (2013.01); *B60K 2031/0091* (2013.01); *B60W 2300/36* (2013.01); *B60W 2520/263* (2013.01); *B60W 2540/10* (2013.01); *B60W 2710/0677* (2013.01)

(58) Field of Classification Search
CPC ....................... B60K 28/16; B60W 30/18172; B60W 50/16; B60W 2520/26
See application file for complete search history.

(56) References Cited

U.S. PATENT DOCUMENTS

| | | | | | |
|---|---|---|---|---|---|
| 5,270,930 | A | * | 12/1993 | Ito ........................ | B60K 17/346 477/35 |
| 5,431,242 | A | * | 7/1995 | Iwata ..................... | B60K 28/16 180/197 |
| 6,494,281 | B1 | * | 12/2002 | Faye ...................... | B60K 31/00 180/197 |
| 8,552,847 | B1 | * | 10/2013 | Hill ........................ | G06F 3/016 116/205 |
| 9,811,066 | B1 | * | 11/2017 | Linnell .................. | G05B 15/02 |

(Continued)

FOREIGN PATENT DOCUMENTS

| | | |
|---|---|---|
| EP | 2857301 A1 | 4/2015 |
| JP | H8067170 A | 3/1996 |

(Continued)

OTHER PUBLICATIONS

Japanese Office Action corresponding to 2015-165124, dated Apr. 2, 2019.

*Primary Examiner* — Calvin Cheung
(74) *Attorney, Agent, or Firm* — Barnes & Thornburg LLP (57) ABSTRACT

A vehicle power control system includes a driving force control unit configured to limit a driving force during acceleration of a vehicle when the vehicle is in a predetermined power control driving state. The driving force control unit includes a notification unit configured to tactilely notify a driver via a throttle manipulator that a driving force limit state occurs during the acceleration of the vehicle.

6 Claims, 7 Drawing Sheets

(56) References Cited

U.S. PATENT DOCUMENTS

| | | | | |
|---|---|---|---|---|
| 2003/0158647 A1* | 8/2003 | Katakura | ............... | B60K 31/04 |
| | | | | 701/70 |
| 2004/0056840 A1* | 3/2004 | Goldenberg | ............ | A63F 13/06 |
| | | | | 345/156 |
| 2008/0059036 A1* | 3/2008 | Imai | .................... | B60W 30/143 |
| | | | | 701/93 |
| 2008/0091318 A1* | 4/2008 | Deng | ..................... | B62D 6/003 |
| | | | | 701/41 |
| 2009/0259370 A1* | 10/2009 | Kaigawa | ............... | B60T 8/1755 |
| | | | | 701/48 |
| 2010/0280713 A1* | 11/2010 | Stahlin | ................. | B60W 50/16 |
| | | | | 701/41 |
| 2011/0053691 A1* | 3/2011 | Bryant | ................. | A63F 13/211 |
| | | | | 463/37 |
| 2011/0309920 A1* | 12/2011 | Brooks | ................. | B61L 15/009 |
| | | | | 340/407.2 |
| 2012/0041658 A1* | 2/2012 | Turner | ............... | B62D 15/0215 |
| | | | | 701/68 |
| 2014/0019006 A1* | 1/2014 | Bruce | ................. | B62D 5/0457 |
| | | | | 701/41 |
| 2014/0257659 A1* | 9/2014 | Dariush | ................. | G08G 1/166 |
| | | | | 701/70 |
| 2015/0131864 A1* | 5/2015 | Driscoll | ............ | G06K 9/00791 |
| | | | | 382/104 |
| 2016/0146618 A1* | 5/2016 | Caveney | ................. | G05D 1/06 |
| | | | | 701/25 |
| 2016/0259362 A1 | 9/2016 | Suzuki et al. | | |

FOREIGN PATENT DOCUMENTS

| | | |
|---|---|---|
| JP | 2006001497 A | 1/2006 |
| JP | 2008111426 A | 5/2008 |
| JP | 2011099382 A | 5/2011 |
| JP | 2013205395 A | 10/2013 |
| WO | 2013175680 A1 | 1/2016 |
| WO | 2015063894 A1 | 3/2017 |

* cited by examiner

VEHICLE POWER CONTROL SYSTEM AND VEHICLE POWER CONTROL METHOD

PRIORITY CLAIM

This patent application claims priority to Japanese Patent Application No. 2015-165124, filed 24 Aug. 2015, the disclosure of which is incorporated herein by reference in its entirety.

BACKGROUND OF THE INVENTION

Field of the Invention

The present invention relates to a vehicle power control technique for reliably notifying a driver of a state of a power controlling state while giving an optimal driving force to a vehicle and for reducing a sense of discomfort resulting from the power control.

Description of the Related Art

A vehicle equipped with a traction control system (TCS) as an apparatus for increasing vehicle running stability is well known. The vehicle TCS is a technique for preventing driving wheels of the vehicle from spinning (slipping) by appropriately controlling a driving force during acceleration of the vehicle in a predetermined power control driving state.

In the vehicle, the driving force produced by an engine is finally transmitted to a road surface through tires of driving wheels. If gripping forces with which the tires grip a road surface are exceeded, the tires slip, making it difficult to transmit the driving force to the road surface.

The vehicle TCS is an apparatus which performs control to instantly reduce the driving force and thereby prevents the driving wheels from spinning when an excessive driving force larger than the gripping forces of the tires are applied to the driving wheels, causing the tires to slip during acceleration.

When a spin condition of the driving wheels is detected by various sensors, the vehicle TCS holds down engine power by controlling engine ignition timing or a throttle valve opening, and thereby recovers the gripping forces of tires gripping the road surface.

In the traction control system (TCS) of the vehicle, a technique for notifying a driver of traction control actuation, indicating that a traction control function is in actuated state generally notifies the driver by illuminating a lamp on an instrument panel as described in Patent Document 1 (Japanese Patent Laid-Open No. 2013-205395). However, in a driving state of a motorcycle, it is difficult for the driver, who drives staring ahead attentively, to check an illuminating state of the lamp, and the driver will not notice that the traction control function is in actuated state and may misunderstand that "acceleration has dropped unexpectedly" due to a drop in engine power.

Also, with the vehicle TCS, an amount of reduction in the driving force during traction control actuation is set beforehand, and cannot be changed freely. Consequently, when the driver tries to turn a corner by intentionally causing rear wheels to slip, the traction control actuation may make it difficult to do cornering or circular driving at will.

Furthermore, a cornering technique whereby the driver intentionally changes a direction of the vehicle by causing the rear wheels to slide (slip) during corner turning has been adopted in motor sports. If traction control is actuated during the corner turning, suppressing rear wheel spin, it becomes difficult for the driver to perform sliding control intentionally.

SUMMARY OF THE INVENTION

The present invention has been made in view of the above circumstances and has an object to provide a vehicle power control technique which can reliably notify a driver of a power control driving state while giving an optimal driving force to a vehicle and reduce a sense of discomfort resulting from power control during vehicle acceleration.

Another object of the present invention is to provide a vehicle power control technique which can tactilely notify the driver of a power control state without obstructing operation of the driver even during corner turning.

Still another object of the present invention is to provide a vehicle power control technique which tactilely notifies the driver of traction control actuation of a vehicle TCS and improves safety of vehicle power control driving.

The above and other objects can be achieved according to the present invention by providing, in one aspect, a vehicle power control system includes a driving force control unit configured to limit a driving force during acceleration of a vehicle when the vehicle is in a predetermined power control driving state. The driving force control unit includes a notification unit configured to tactilely notify a driver via a throttle manipulator that a driving force limit state occurs during the acceleration of the vehicle.

According to the present invention, when a driving wheel is in a required slip state, an optimal driving force is provided to a vehicle and at the same time actuation of driving force control can be reported directly by a notification unit and transmitted tactilely to the driver via a throttle manipulator. Since the notification unit can tactilely notify the driver of the actuation resulting from vehicle power control via the throttle manipulator, a sense of discomfort resulting from power control can be reduced.

The nature and further characteristic features of the present invention will be described hereinafter in the following descriptions made with reference to the accompanying drawings, and the other advantages effects and functions of the present invention will be also made clear hereinafter.

DETAILED DESCRIPTION

Hereinbelow, a description will be given of a vehicle power control system according to embodiments of the present invention with reference to the drawings.

Figure 1:
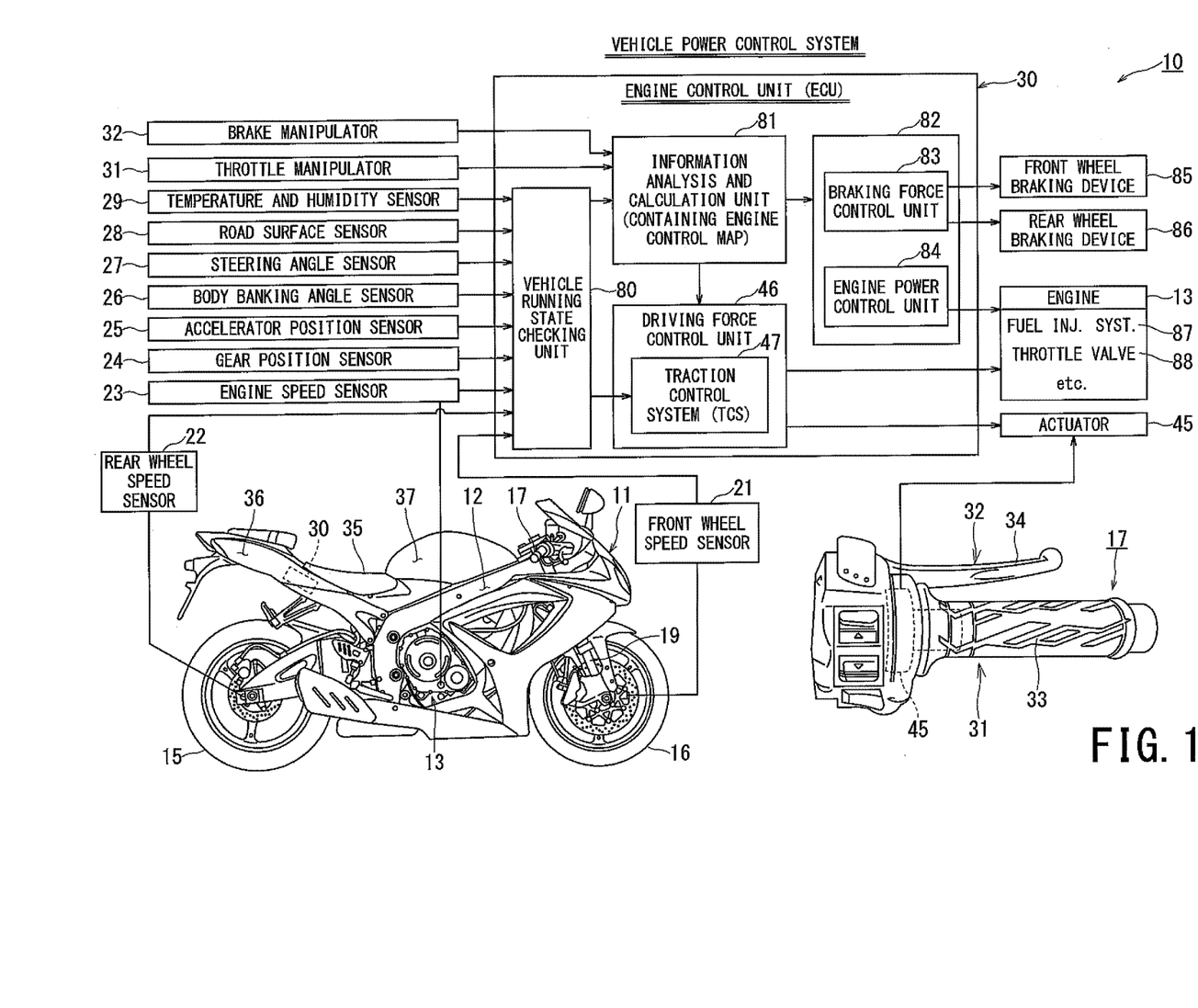
FIG. 1 is a confirmation diagram of a motorcycle resulting from application of a vehicle power control system according to an embodiment of the present invention.

FIG. 1 is a confirmation diagram of a motorcycle resulting from application of a vehicle power control system according to an embodiment of the present invention. A vehicle power control system 10 controls an optimal driving force for a vehicle using an engine control unit (ECU) 30 and at the same time reliably notifies a driver of actuation of power control, reduces a sense of discomfort resulting from power control, and improves safety of vehicle power control driving.

A motorcycle 11 includes an engine 13 mounted on a body frame 12. As the engine 13 operates, engine power is transmitted to a rear wheel 15 via a power transmission system, driving the rear wheel 15 as a driving wheel. A front wheel 16 is steered by handle bars 17 via a steering mechanism 18 and front fork 19, thereby functioning as a steered wheel.

Also, the motorcycle 11 has a front wheel speed sensor 21 installed on the side of the front wheel 16, and a rear wheel speed sensor 22 installed on the side of the rear wheel 15. Also, on the side of the body frame 12, an engine speed (crank angle) sensor 23, a gear position sensor 24, and a throttle (accelerator) position sensor 25 are installed around the engine 13, and a body banking angle sensor 26, a steering angle sensor 27, a road surface sensor 28, a temperature and humidity sensor 29 are installed in various parts of a vehicle body. Sensing information from various sensors is inputted to the engine control unit (ECU) 30. Furthermore, operation signals are also inputted to the ECU 30 from a throttle manipulator 31 and a brake manipulator 32. The throttle manipulator 31 is a throttle grip 33 or a non-illustrated throttle lever on a right handle bar while the brake manipulator 32 is a brake lever 34 located forward of the throttle grip 33 or a non-illustrated brake pedal.

The engine control unit (ECU) 30 mounted on the motorcycle 11 is installed in a rear part under a seat 35 or installed at a rear end of a seat rail by being covered with a body cover 36. The ECU 30 is an electronic control system made up of a computer with high processing power, and accepts sensing information from various sensors and operation information from the throttle manipulator 31 and the brake manipulator 32 as input, analyzes the information, and performs computational processing on the information. The ECU 30 is a piece of electronic equipment susceptible to water damage, and thus an internal control board is encapsulated in resin to reinforce water resistance and vibration resistance and increase weather resistance. Note that reference numeral 37 denotes a fuel tank installed in front of the seat 35.

Figure 2:
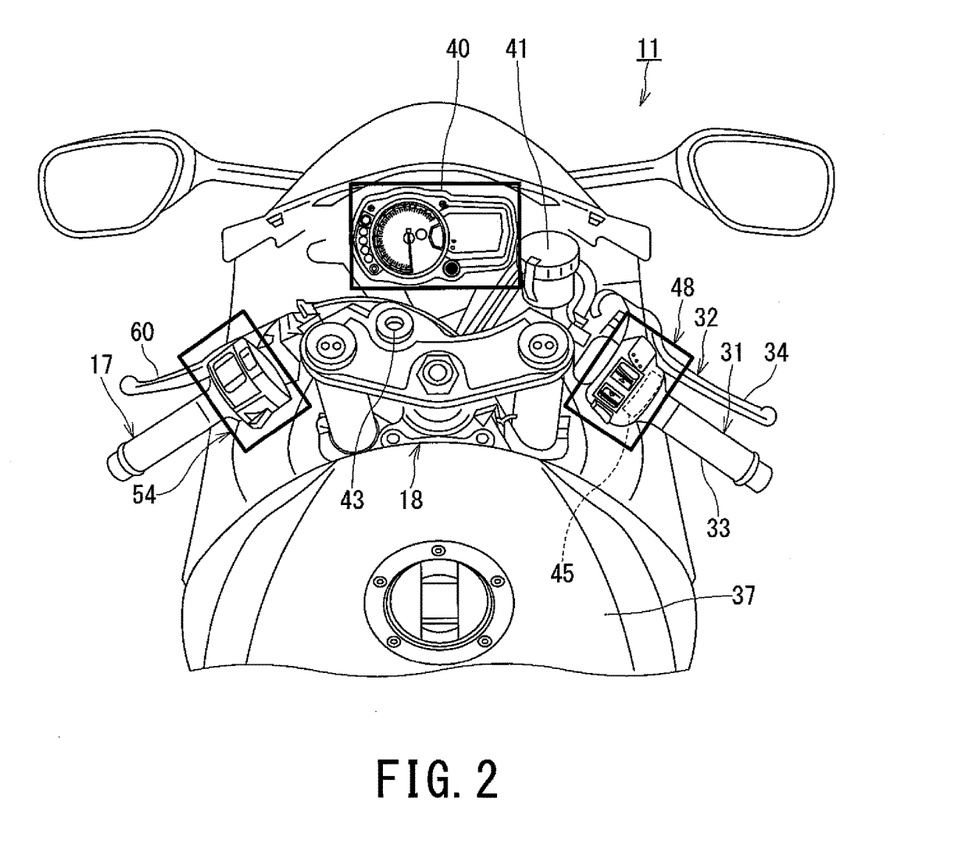
FIG. 2 is a layout plan showing handle bars and surroundings of an instrument panel located obliquely forward and downward of a driver riding the motorcycle.

Meanwhile, the motorcycle 11 has an instrument panel 40 installed in front of the handle bars 17 obliquely forward and downward of a driver (rider) riding the motorcycle, as shown in FIG. 2. A main switch 43 and a brake fluid reservoir tank 41 are placed near the instrument panel 40. The throttle grip 33 making up the throttle manipulator 31 is installed on the right handle bar and the brake lever 34 making up the brake manipulator 32 is installed in front of the throttle grip 33.

An actuator 45 is contained in the right handle bar on a root (base) side of the throttle grip 33. An operating force is transmitted to the actuator 45 from the throttle grip 33, and as described later, actuation of the actuator 45 is controlled by a traction control system (TCS) 47 of a driving force control unit 46 provided on the ECU 30 shown in FIG. 1.

Upon actuation of traction control, a resistive force is applied against a throttle opening (accelerator opening) input (arrow direction A in FIG. 3) and the resistive force is transmitted to the throttle grip 33. Upon actuation of traction control of the TCS 47, a resistive force is generated in a throttle opening direction (arrow direction A in FIG. 3) or vibration is generated by the actuator 45 and micro vibration is transmitted to the throttle grip 33 to indicate that traction control is actuated. Upon actuation of traction control, by applying a resistive force through actuation of the actuator 45 or by transmitting vibration tactilely to a hand or foot of the driver, the driver can be tactilely notified that a driving force limit state occurs during the acceleration of the vehicle, e.g., that traction control is actuated.

Figure 3:
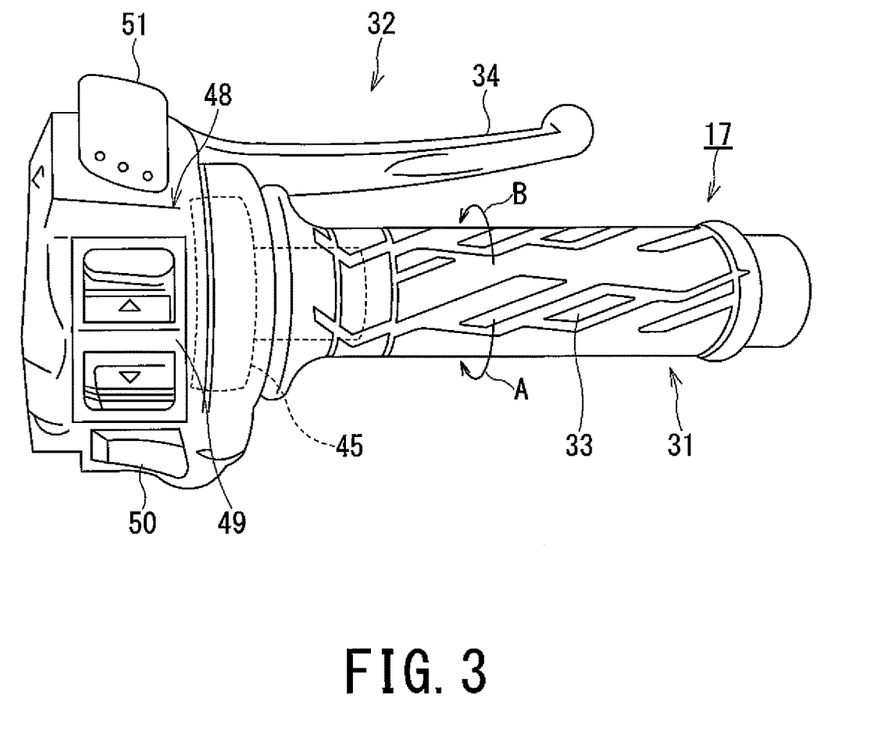
FIG. 3 is a diagram showing a right handle bar of the motorcycle.

Furthermore, as shown in FIGS. 2 and 3, right handle switches 48 are installed on a root side of the right handle bar. The right handle switches 48 include a meter display conversion switch 49 adapted to convert display on the instrument panel 40, a starter switch 50, and an engine stop switch 51.

Figure 4:
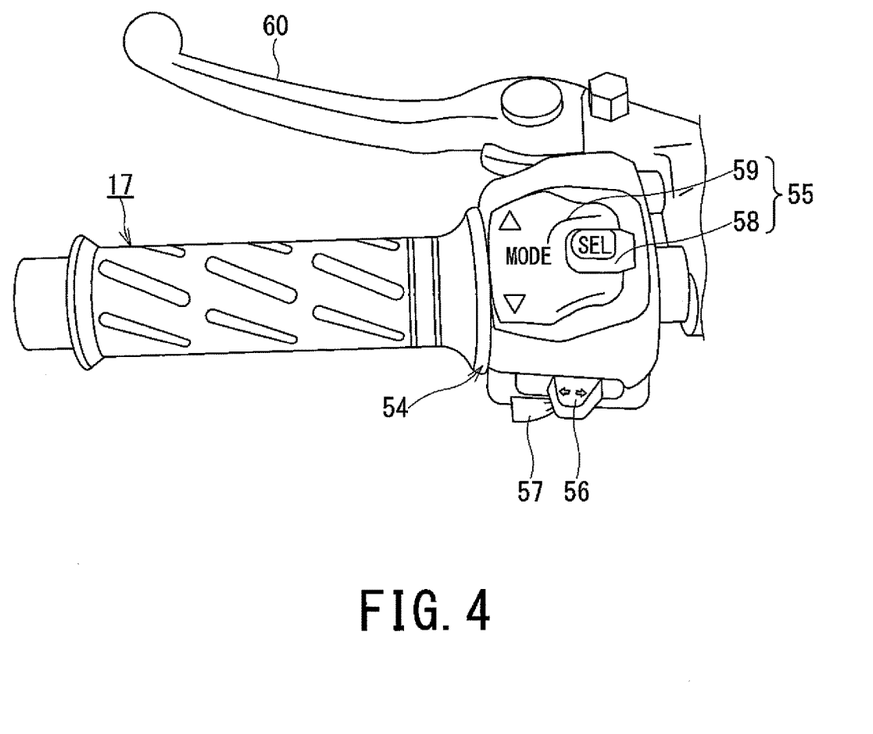
FIG. 4 is a diagram showing a left handle bar of the motorcycle.

As shown in FIGS. 2 and 4, left handle switches 54 are installed on a root side of the left handle bar. The left handle switches 54 include a traction control switch unit 55, a turn signal switch 56, and a horn switch 57. The traction control switch unit 55 includes a traction control system (TCS) switch 58 and a TCS mode select switch 59. The traction control switch unit 55 can turn on and off the TCS 47 and select a mode using the TCS switch 58 and the TCS mode select switch 59.

The TCS mode select switch 59 allows the driver to select one of three driving modes—[1], [2], and [OFF]—according to preference of the driver. Mode [1] sets sensitivity to a low level and controls engine power so as to permit a predetermined amount of rear wheel tire spin within a range of the driver's normal operation. This means that even if traction control is not actuated by the TCS 47, i.e., even if a "resistive force in the throttle opening (accelerator opening) direction" is not acting, a little spin is possible. When rear wheel tire spin exceeds the predetermined amount, the TCS 47 actuates traction control (the resistive force in the throttle opening direction comes into action), and when the driver wants to re-accelerate (permit spin) at this time, the driver can re-accelerate by further opening the throttle (turning the throttle grip 33 in direction A in FIG. 3). Note that the throttle grip 33 is turned in direction B to close the throttle.

Mode [2] sets sensitivity to a high level and controls engine power so as to permit a smaller amount of rear wheel tire spin than when mode [1] is selected. A remaining mode, i.e., mode [OFF], disables actuation of the TCS 47. Note that in FIG. 4, a clutch lever 60 is installed in front part of the left handle bar.

Figure 5:
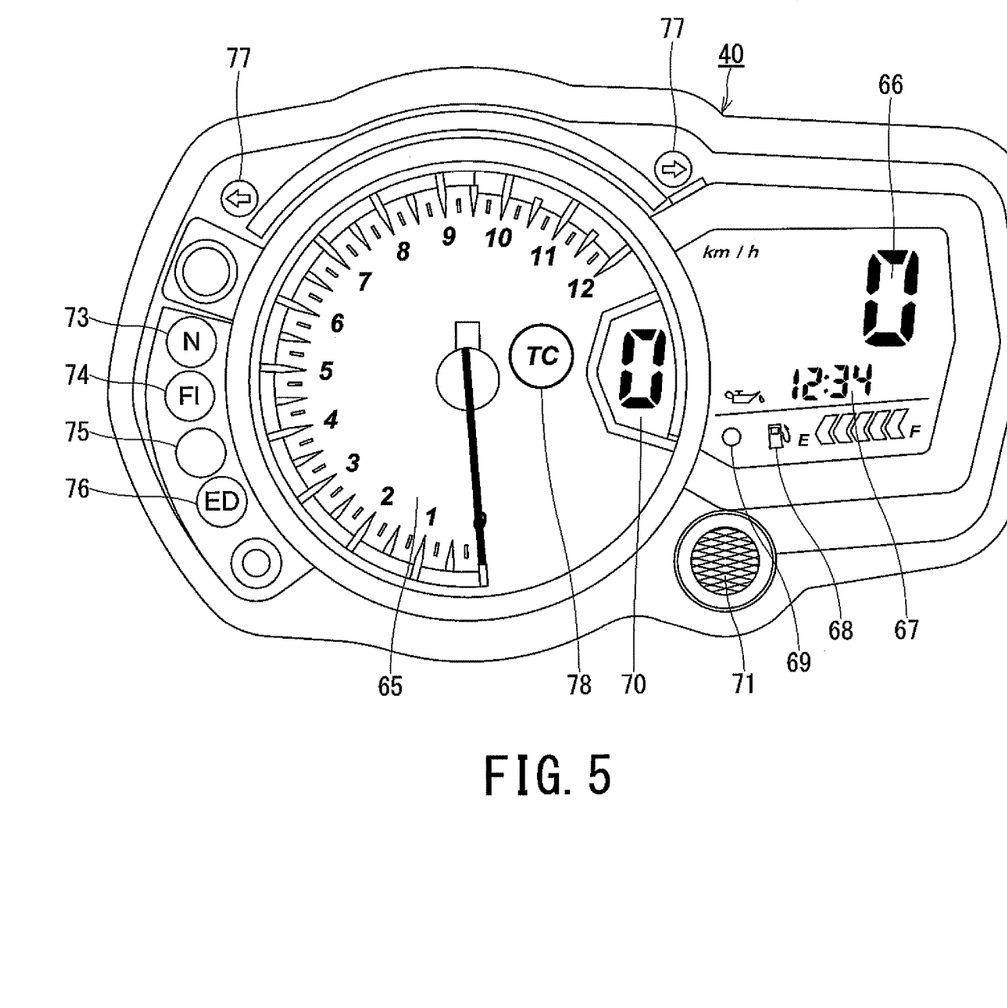
FIG. 5 is layout chart of an instrument panel provided on the motorcycle.

As shown in FIG. 5 for example, on the instrument panel 40 in front of the handle bars, an engine revolution counter 65 is installed at an easy-to-read location in center, and a speedometer 66 with a digital readout is installed on the right side of the engine revolution counter 65. A clock 67, a fuel gauge 68, and a warning lamp 69 shaped like an oil lamp may be installed near the speedometer 66 as appropriate. Also, a gear position indicator 70 is installed between the engine revolution counter 65 and the speedometer 66 to indicate at what speed a transmission mechanism is running and thereby allow the driver to check the speed. A shift change indicator 71 is installed near the gear position indicator 70 to indicate appropriate shift change timing.

Around the engine revolution counter 65 on the instrument panel 40, a neutral lamp 73, a fuel indication lamp 74, an ABS lamp 75, and a high beam lamp 76 are laid out on a side opposite the speedometer 66 and the clock 67 while a hazard blinker/indicator 77 is laid out in upper part around the engine revolution counter 65.

Furthermore, a TCS indicator lamp 78 adapted to indicate traction control actuation of the TCS 47 and a TCS OFF indicator lamp 79 are installed on a panel surface of the engine revolution counter 65.

Now, referring back to FIG. 1, in the vehicle power control system 10, the engine control unit (ECU) 30 is provided with a vehicle running state checking unit 80 and an information analysis and calculation unit 81, where the vehicle running state checking unit 80 accepts input sensing information from various sensors, including the wheel speed sensors 21 and 22 on the front and rear wheels 16 and 15, the engine speed sensor 23, the gear position sensor 24, the accelerator position sensor 25, and the body banking angle sensor 26 and checks a running state of the vehicle while the information analysis and calculation unit 81 accepts input sensing information from various sensors and operation information from the throttle manipulator 31 and the brake manipulator 32, analyzes the information, and calculates an optimum fuel injection quantity, injection period, and ignition timing.

The information analysis and calculation unit 81 contains an engine control map specifying optimum engine power characteristics according to the running state of the vehicle, road surface condition, and weather condition in advance. The information analysis and calculation unit 81 accepts input sensing information from various sensors and operation information from the throttle manipulator 31 and the like, analyzes the information, compares analysis results with the engine control map, performs calculations, determines an optimum fuel injection quantity, injection period, and ignition timing according to each piece of the information, and outputs results to a total control unit 82.

The total control unit 82 includes a braking force control unit 83 and an engine power control unit 84. The braking force control unit 83 receives an output signal from the information analysis and calculation unit 81 and performs braking force control for each of a front wheel braking device 85 and a rear wheel braking device 86.

Based on an output signal from the information analysis and calculation unit 81, the engine power control unit 84 controls actuation of the engine 13, a fuel injection system 87, and a throttle valve 88 and controls air-intake into the engine 13, the ignition timing, the fuel injection quantity, and the injection period accordingly.

A calculation output signal from the information analysis and calculation unit 81 is also inputted to the driving force control unit 46. When a rotational speed difference (Vr−Vf) calculated from wheel speed Vr of the rear wheel 15 and wheel speed Vf of the front wheel 16 exceeds a predetermined value α (>=0), the driving force control unit 46 determines that the driving wheel is in a slip state, i.e., in a spin condition, and actuates the traction control system (TCS) 47.

The TCS 47 finely measures the sensing information from various sensors, including the wheel speeds of the rear wheel 15 and the front wheel 16, engine speed, accelerator opening, and gear position, for example, 250 times per second. If slip (spin) of the rear wheel 15, which is the driving wheel, is detected, the TCS 47 recovers a gripping force of the rear wheel tire by controlling the fuel injection quantity of the fuel injection system 87 and a throttle opening of the throttle valve 88 and reducing engine power.

Figure 6:
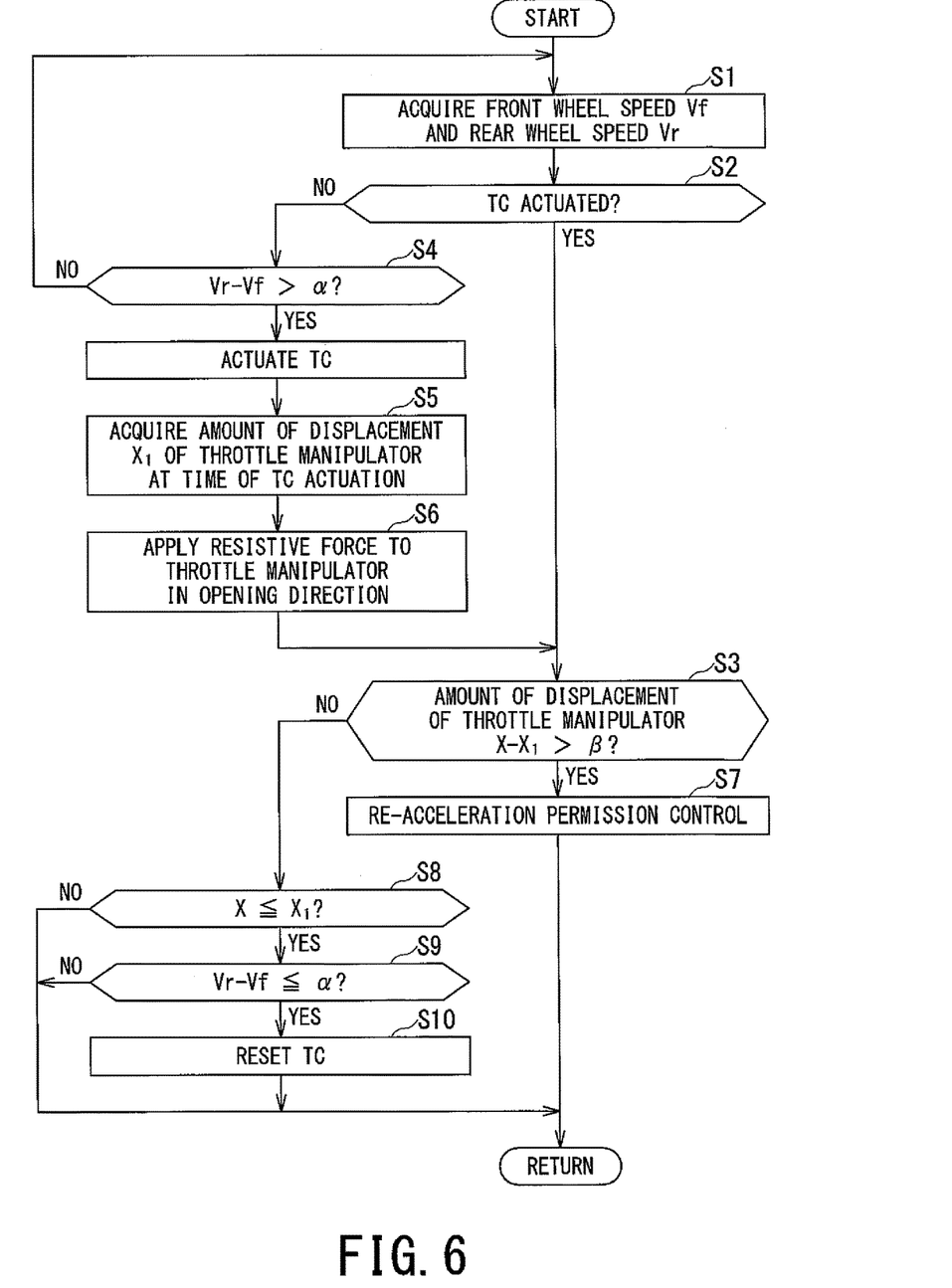
FIG. 6 is a control flowchart showing an example of vehicle power control driving of the motorcycle.

Control flow of the TCS 47 for the vehicle power control driving is carried out as shown in FIG. 6.

The engine control unit (ECU) 30 of the vehicle power control system 10 acquires the wheel speed Vf of the front wheel 16 and wheel speed Vr of the rear wheel 15 from the front wheel speed sensor 21 and the rear wheel speed sensor 22 in step 1 (S1). As will be described in detail later, when the rotational speed difference (Vr−Vf) between the rear wheel 15 and front wheel 16 calculated from the acquired wheel speed Vr of the rear wheel 15 and wheel speed Vf of the front wheel 16 exceeds the predetermined value α, the driving force control unit 46 determines that the vehicle is in a slip state. Then, depending on whether or not the rotational speed difference (Vr−Vf) has exceeded the predetermined value α≥0, it is determined whether or not the TCS 47 should actuate traction control. Next, as shown in step 2 (S2), it is determined whether or not the TCS 47 has actuated traction control. If the TCS 47 has actuated traction control, the ECU 30 moves to step 3 (S3) and determines whether or not the throttle manipulator 31 is being operated for re-acceleration during actuation of traction control.

Generally, gripping forces of the tires of the rear wheel 15 and the front wheel 16 are maximized when the tires are slipping to some extent (around 20% to 30%), and thus a slip ratio is set for every banking angle in advance, and when a set value (of the slip ratio) is exceeded, the TCS 47 is caused to actuate traction control in step 2 (S2). Also, instead of setting slip ratios in advance, the ECU 30 may finely measure sensing information, including rotational speeds of the front and rear wheels 16 and 15, engine speed, accelerator opening, and gear position, for example, 250 times per second, compare the sensing information with basic patterns, and perform meticulous engine control, controlling actuation of the fuel injection system 87, the throttle valve 88, and the like so as to maintain the slip ratio which maximizes the gripping forces.

On the other hand, when it is determined in step 2 (S2) that the TCS 47 has not actuated traction control, the driving force control unit 46 determines in step 4 (S4) whether or not the rotational speed difference (Vr−Vf) between the wheel speed Vr of the rear wheel 15 and wheel speed Vf of the front wheel 16 exceeds the predetermined value α. When the rotational speed difference (Vr−Vf)>α, it is determined that the vehicle is in a slip state and the TCS 47 starts actuation of traction control. An amount of operation (amount of turning) $X_1$ of the throttle manipulator 31 such as the throttle grip 33, at the time of actuation (start) of traction control is measured in step 5 (S5). When the rotational speed difference (Vr−Vf) between the front wheel 16 and the rear wheel 15 is equal to or smaller than the predetermined value α, the ECU 30 returns to step 1 (S1) again.

On the other hand, when an amount of displacement $X_1$ of the throttle manipulator 31 at the time of actuation (start) of traction control is acquired in step 5 (S5), the TCS 47 sends an output signal on the traction control actuation to the actuator 45, and thereby actuates the actuator 45 of the throttle manipulator 31 (which is a notification unit). As shown in step 6, the actuator 45 applies a required resistive force to the throttle manipulator 31 in the throttle opening direction. The throttle manipulator 31 has the required resistive force applied, for example, to the throttle grip 33 in the throttle opening (accelerator opening) direction A and the throttle grip 33 becomes harder to move in the throttle opening direction or vibration is applied to the throttle grip 33, thereby notifying the driver of the actuated state of TC via the throttle grip 33 from the actuator 45. The throttle manipulator 31 acts to inhibit operation of the throttle grip 33 in the throttle opening direction A. That is, the actuator 45 is actuated such that a resistive force will be applied to the throttle manipulator 31 such as the throttle grip 33, so as to resist "further operation in the throttle opening direction."

Then, in step 3 (S3), the TCS 47 finds a difference $(X-X_1)$ between an amount of operation X of the throttle manipulator 31 and an amount of throttle displacement $X_1$ at the time of TC actuation (start) and it is determined whether or not the difference $(X-X_1)$ of throttle operation exceeds a required value β. When the difference $(X-X_1)$ of throttle operation exceeds the required value β, re-acceleration through operation of the throttle manipulator 31 in the throttle opening direction is permitted. That is, when the driver wants to re-accelerate further, although operation in the throttle opening, re-accelerating direction, becomes hard to carry out because of the applied resistive force, the actuator 45 permits further opening operation (turning operation in direction A in FIG. 3) of the throttle grip 33. Therefore, as shown in step 7 (S7), it becomes possible to re-accelerate by further opening the throttle grip 33, which is the throttle manipulator 31, without obstructing operability during cornering, for example, in cornering operation of the driver even when traction control is actuated.

Thus, even if the engine control unit (ECU) 30 is equipped with the TCS 47, the vehicle power control driving can be carried out while giving an optimal driving force to the vehicle without obstructing cornering operation of the driver. Besides, the traction control actuation of the TCS 47, i.e., the application of the resistive force in the throttle opening direction, is transmitted directly from the actuator 45 to the throttle grip 33 through bodily sensation and the actuator 45 can make the driver bodily sense the traction control actuation directly by making operation of the throttle grip 33, which is the throttle manipulator 31, in the throttle opening direction hard to carry out or applying vibration to the throttle grip 33. The driver can tactilely sense the traction control actuation through the throttle manipulator 31 such as the throttle grip 33.

The traction control actuation of the TCS 47 tends to occur when a vehicle body runs in an unstable condition such as when accelerating during wet road driving or cornering. However, being tactilely notified of traction control actuation through bodily sensation via the throttle manipulator 31, the driver can concentrate on driving without checking instrumentation on the instrument panel 40, resulting in high convenience.

Furthermore, when the driver is also allowed to visually sense the traction control actuation of the TCS 47 through illumination of the TCS indicator lamp 78 on a panel surface of the instrument panel 40, not only the traction control actuation of the TCS 47 is transmitted directly to a hand of the driver via the throttle grip 33 through actuation of the actuator 45, but also the driver can visually sense the traction control actuation of the TCS 47 by checking the TCS indicator lamp 78.

Again, in step 3 (S3) of FIG. 6, when the difference $(X-X_1)$ in throttle operation on the throttle manipulator 31 is equal to or smaller than the required value β, i.e., when the difference $(X-X_1)$ in throttle operation is $(X-X_1) \leq \beta$, the actual amount of operation X of the throttle manipulator 31 is compared in step 8 (S8) with the amount of displacement $X_1$ of the throttle manipulator 31 at the time of actuation (start) of traction control. When the amount of operation X is smaller than the amount of displacement $X_1$, the ECU 30 moves to step 9 (S9). In step 9, the rotational speed difference (Vr-Vf) between the wheel speed Vr of the rear wheel 15 and wheel speed Vf of the front wheel 16 is determined. Then, when the rotational speed difference (Vr-Vf) is equal to or smaller than the predetermined value α, i.e., when $(Vr-Vf) \leq \alpha$, the traction control actuation is reset in step 10 (S10) and the vehicle driving force control operation is finished.

Furthermore, when it is found in step 8 (S8) that the amount of operation X of the throttle manipulator 31 exceeds the amount of displacement $X_1$ of the throttle manipulator 31 at the time of TC actuation or when it is found in step 9 that the rotational speed difference (Vr-Vf) between the rear wheel 15 and the front wheel 16 exceeds the predetermined value α, the control operation of the TCS 47 is continued.

Figure 7A:
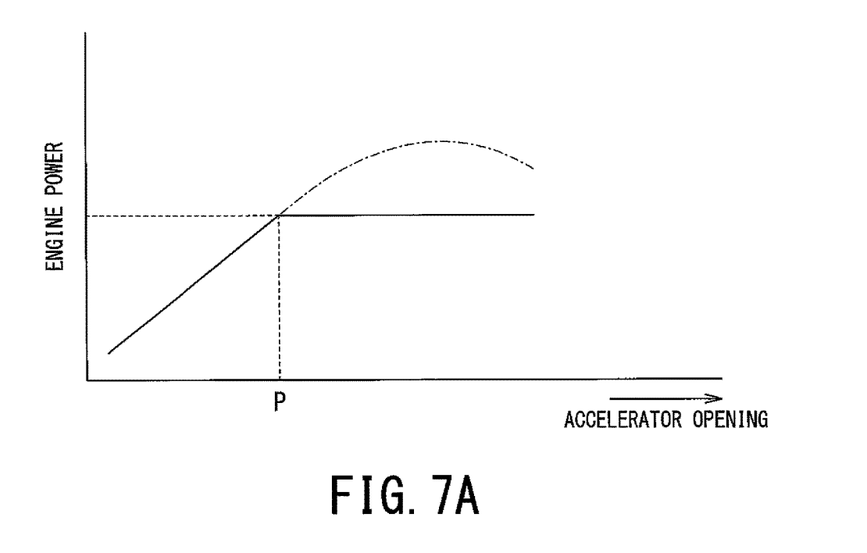
FIG. 7A is a diagram showing an example of traction control actuation of a conventional traction control system (TCS)

Conventionally, as shown in FIG. 7A, when the TCS detects traction control actuation at point P in accelerator opening (throttle opening) operation by the throttle manipulator, even if the accelerator opening operation of the throttle manipulator is continued, the engine power does not increase and is kept, for example, at a fixed value.

Figure 7B:
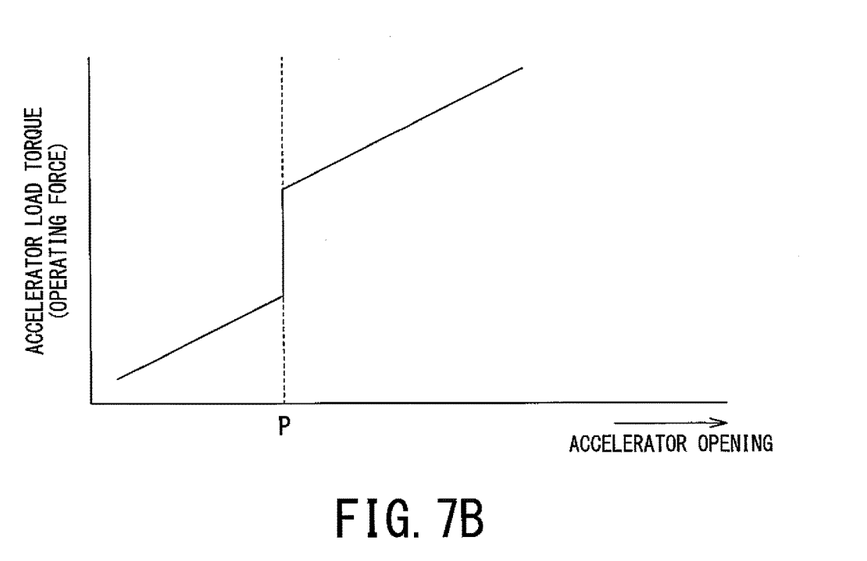
FIG. 7B is a diagram showing an example of traction control actuation of a vehicle power control system according to the embodiment of the present invention.

However, with the vehicle power control system 10 according to the present embodiment, as shown in FIG. 7B, when the TCS 47 detects traction control actuation at point P, the throttle manipulator 31 receives a large resistive force, i.e., accelerator load torque, in the accelerator opening direction from the actuator 45 at point P. The throttle manipulator 31 receives the accelerator load torque at point P, increasing the operating force in the accelerator opening direction due to action of reaction torque, but the driver can further continue operation in the accelerator opening direction.

With the vehicle power control system 10 according to the present embodiment, when the driving force control unit 46 performs vehicle driving force limit control upon detection of a slip state or abnormality, a feel of the throttle manipulator 31 (such as the throttle grip 33 or a throttle lever, or an accelerator pedal in the case of a four-wheel vehicle) touched by a hand or foot of the driver is made heavy by actuation of the actuator 45 (of the notification unit) or micro vibration is applied to notify the driver of the slip state or abnormality. Consequently, the driver can bodily sense the actuation of the vehicle driving force control directly, without looking at the instrumentation on the instrument panel 40. This makes it possible to avoid misconception and improve comfort.

Also, at the time of actuation of vehicle driving force limit control when the operating force required for operation in the throttle opening direction is increased by applying a resistive force to the throttle manipulator 31 through actuation of the actuator 45, the operation in the throttle opening direction can be restricted.

Furthermore, the driving force control unit 46 equipped with the traction control system (TCS) 47, upon actuation of traction control of the TCS 47 due to slip, when a feel of the throttle manipulator 31 touched by a hand or foot of the driver is made heavy through actuation of the actuator 45, the driver can bodily sense the actuated state of the vehicle traction control directly, making it possible to restrict further operation in the throttle opening direction.

Also, the traction control actuation of the TCS 47 tends to occur when the vehicle body is unstable such as in the case of accelerated running during wet road driving or cornering, since the driver can bodily sense the traction control actuation in a tactile manner via the throttle manipulator 31 through actuation of the actuator 45, the driver can concentrate on driving without the need to check instrumentation on the instrument panel 40, resulting in high safety.

Furthermore, the TCS 47 of the driving force control unit 46 provided on the ECU 30, makes it possible to accelerate the vehicle reliably in a stable manner during normal driving by the effect of traction control. In addition, the TCS 47 provides a technique and performance which can control the slip state freely according to preference of the driver even when traction control is actuated without obstructing operability during cornering and the like.

Thus, in the vehicle power control system 10 according to the present embodiment, the TCS 47 of the driving force control unit 46 can tactilely notify the driver about traction control actuation while giving an optimal driving force to the vehicle through engine power control of the ECU 30 and reduce the sense of discomfort resulting from engine power control.

Whereas a power control technique for the motorcycle 11 has been described in relation to the vehicle power control system 10 according to the present embodiment, the vehicle power control system 10 is not limited to motorcycles, and is applicable to power control techniques for three-wheeled vehicles and four-wheeled vehicles.

Although the embodiment of the present invention has been described citing a case in which the traction control system (TCS) 47 provided on the driving force control unit 46 of the engine control unit (ECU) 30 controls actuation of the actuator 45 of the notification unit at the time of traction control actuation of the TCS 47, this is not restrictive, and the notification unit can be used not only at the time of TC actuation, but also to notify the driver of an abnormal state. For example, the notification unit may be used as a unit of detecting abnormal operation, such as a rapid throttle opening with the throttle manipulator, and notifying the driver.

Although in the present embodiment, an example in which the vehicle power control system 10 is applied to a TCS-equipped vehicle in which the driving force control unit 46 of the ECU 30 is equipped with the traction control system (TCS) 47, the vehicle power control system 10 can be applied to a driving force control unit of vehicles other than TCS-equipped vehicles.

Furthermore, although an example in which the rear wheel of a motorcycle is a driving wheel has been described in the embodiment of the invention, the vehicle power control system 10 can also be applied to vehicles in which the driving wheel(s) is/are the front wheel(s). Even in the case of a vehicle whose driving wheel(s) is/are the front wheel(s), a determination can be made in a manner similar to the present embodiment using a rotational speed difference (Vf–Vr) between the front wheel(s) and rear wheel(s). When the rotational speed difference (Vf–Vr) between the front wheel(s) and rear wheel(s) exceeds the predetermined value α, the TCS can similarly actuate traction control by determining that the vehicle is in a slip state.

Regarding the notification unit, besides the throttle manipulator 31 such as the throttle grip 33 or throttle lever, a throttle manipulator of an accelerator pedal of a four-wheel vehicle may be used as a notification unit.

In the vehicle power control system 10 according to the present embodiment, the TCS 47 may incorporate a power control map for traction control actuation. If the TCS 47 incorporates a power control map for use during traction control actuation which requires more meticulous power control than is normally the case (where the traction control actuation involves meticulous engine control performed 250 times per second), it becomes easier to perform engine power control quickly and precisely.

The above-mentioned embodiments are presented as examples only, but not intended to limit the scope of the inventions. The embodiments described herein may be embodied in various forms including three or four wheel vehicles; furthermore, omissions, substitutions and changes of the present embodiments may be made without departing from the spirit of the inventions. The accompanying claims and their equivalents are intended to cover such modifications as would fall within the scope of the inventions.

The invention claimed is:

1. A vehicle power control system comprising:
a driving force control unit configured to limit a driving force during acceleration of a vehicle when the vehicle is in a predetermined power control driving state,
wherein the driving force control unit includes a notification unit configured to tactilely notify a driver via a throttle manipulator that a driving force limit state occurs during the acceleration of the vehicle,
wherein the notification unit includes an actuator installed on the throttle manipulator, and
wherein, when the driving force limit state occurs during the acceleration of the vehicle, the actuator applies a resistive force to the throttle manipulator to resist further operation in a throttle opening direction.

2. The vehicle power control system according to claim 1, wherein:
the driving force control unit includes a traction control system configured to limit the driving force during the acceleration of the vehicle when a driving wheel of the vehicle is in a required slip state; and
the traction control system actuates the notification unit at a time of traction control actuation and an actuation force of the notification unit is transmitted tactilely to the driver via the throttle manipulator.

3. The vehicle power control system according to claim 2, wherein:
the traction control system is provided in an engine control unit (ECU) configured to accept input sensing information from sensors of the vehicle and control engine power of the vehicle; and
at the time of traction control actuation, the traction control system permits operation for re-acceleration performed via the throttle manipulator and controls a slip state of the driving wheel.

4. The vehicle power control system according to claim 2, wherein:
the throttle manipulator allows the driver to perform operation in the throttle opening direction at the time of traction control actuation of the traction control system; and
after the traction control actuation, when an amount of operation of the throttle manipulator in the throttle opening direction exceeds a predetermined value, the traction control system permits operation for re-acceleration performed via the throttle manipulator.

5. The vehicle power control system according to claim 4, wherein the throttle manipulator controls the driving force of the vehicle during re-acceleration according to the amount of operation in the throttle opening direction.

6. A vehicle power control method for limit a driving force during acceleration of a vehicle by a driving force control unit when the vehicle is in a predetermined power control driving state, the method comprising:
limiting, by the driving force control unit, the driving force during acceleration of the vehicle when a driving wheel of the vehicle is in a required slip state, and actuating a notification unit; and
transmitting tactilely an actuation force of the notification unit to a driver via the throttle manipulator,
wherein the notification unit includes an actuator installed on the throttle manipulator, and wherein, when the driving force limit state occurs during the acceleration of the vehicle, the actuator applies a resistive force to the throttle manipulator to resist further operation in a throttle opening direction.

\* \* \* \* \*